431-148
G. T. PARKHURST.
Lamp Extinguisher.
No. 301. A. I. Patented Oct. 2, 1860.
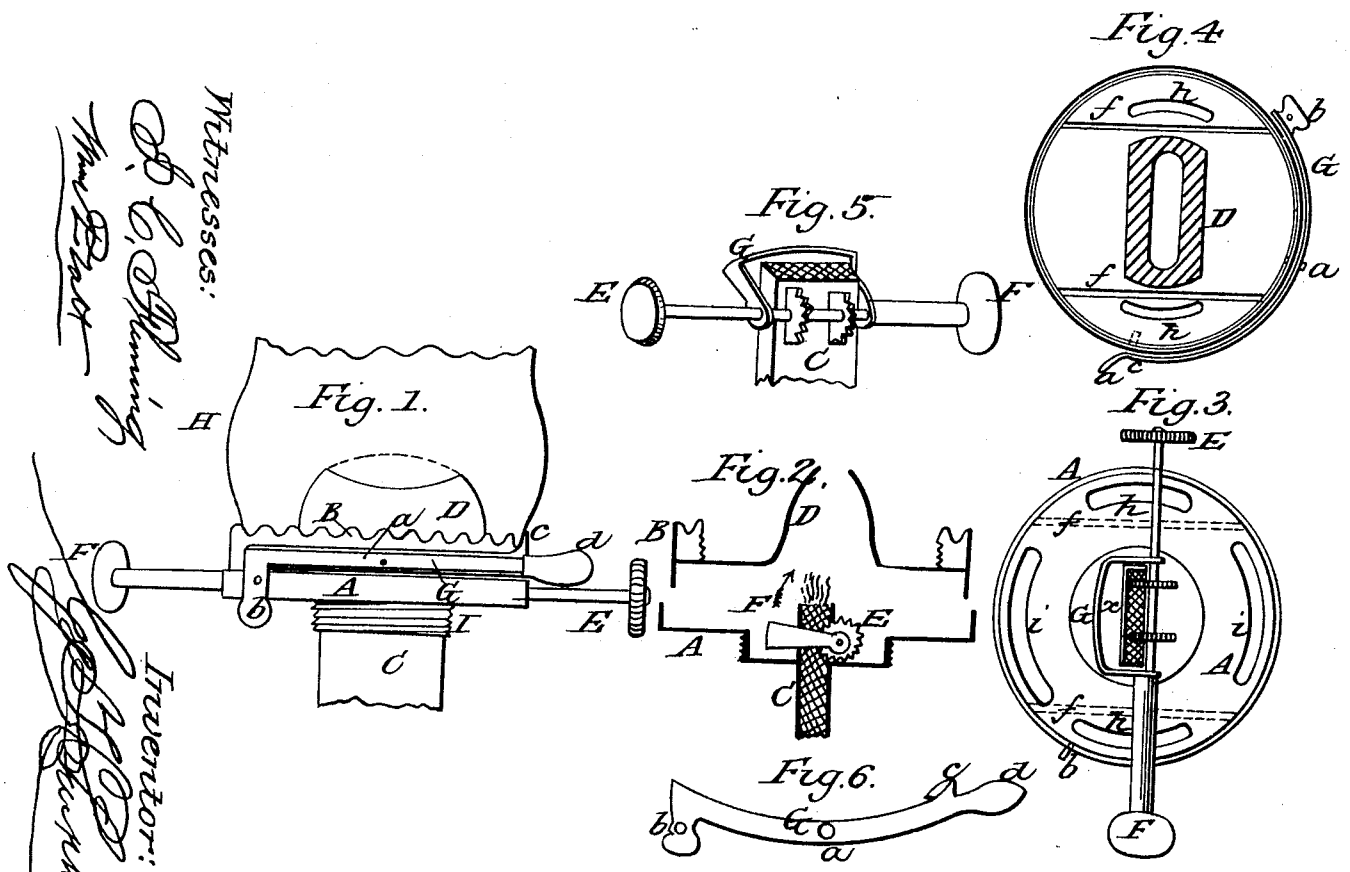
Witnesses:
S. C. Fleming
Wm. Pratt
Inventor:
G. T. Parkhurst
N. PETERS, Photo-Lithographer, Washington, D. C.